United States Patent
Itzkan

[11] 3,740,665
[45] June 19, 1973

[54] TRANSVERSE FLOWING LIQUID LASER
[75] Inventor: Irving Itzkan, Boston, Mass.
[73] Assignee: Avco Corporation, Cincinnati, Ohio
[22] Filed: Mar. 16, 1972
[21] Appl. No.: 235,217

[52] U.S. Cl.................. 331/94.5, 330/4.3, 356/246
[51] Int. Cl............................................. H01s 3/20
[58] Field of Search ................... 331/94.5; 330/4.3; 350/160; 356/246

[56] References Cited
UNITED STATES PATENTS

| | | | |
|---|---|---|---|
| 3,663,891 | 5/1972 | Kocher | 331/94.5 |
| 3,684,979 | 8/1972 | Myer et al. | 331/94.5 |
| 3,675,990 | 7/1972 | Kogelnik et al. | 331/94.5 |

Primary Examiner—William L. Sikes
Attorney—Charles M. Hogan and Melvin E. Frederick

[57] ABSTRACT

Stimulated emission of radiation (laser action) is produced in materials generally classed as dyes. These dyes may be dissolved in a liquid solution. A quantity of dye in a flowing liquid solution in a module or cavity is pumped or exicted by a laser beam radiating in the ultraviolet region which is focused to a line with a cylindrical lens. A rectangular cross sectional beam of such radiation is produced by a pulsed crossed field nitrogen gas laser. The focused line which is transverse to the beam produced by the exciting laser, and transverse to the direction of the flowing dye lies near the surface of the dye material in the cell, and is substantially as long as the cell is wide. The cell lies within an intensifying optical cavity which may be formed by a 100 percent reflecting mirror and a partially reflecting mirror both perpendicular to the line of focus of the pumping radiation. The stimulated emission from the dye material is characterized by a short pulse width and a little loss of energy between the two lasers. High pulse rates with dye circulation, and high conversion efficiencies of the dye when so pumped, are obtained. For frequency adjustment the optical cavity substitutes for the 100 percent mirror a grating or Littrow prism at the appropriate angle. Further spectral narrowing may be obtained by inserting a tilted Fabry-Perot etalon in the cavity. By using such a frequency tuner and a plurality of dye materials which emit stimulated radiation over different portions of the spectrum, the present device can provide laser radiation for virtually the whole visible spectrum and into the infrared and ultraviolet.

7 Claims, 2 Drawing Figures

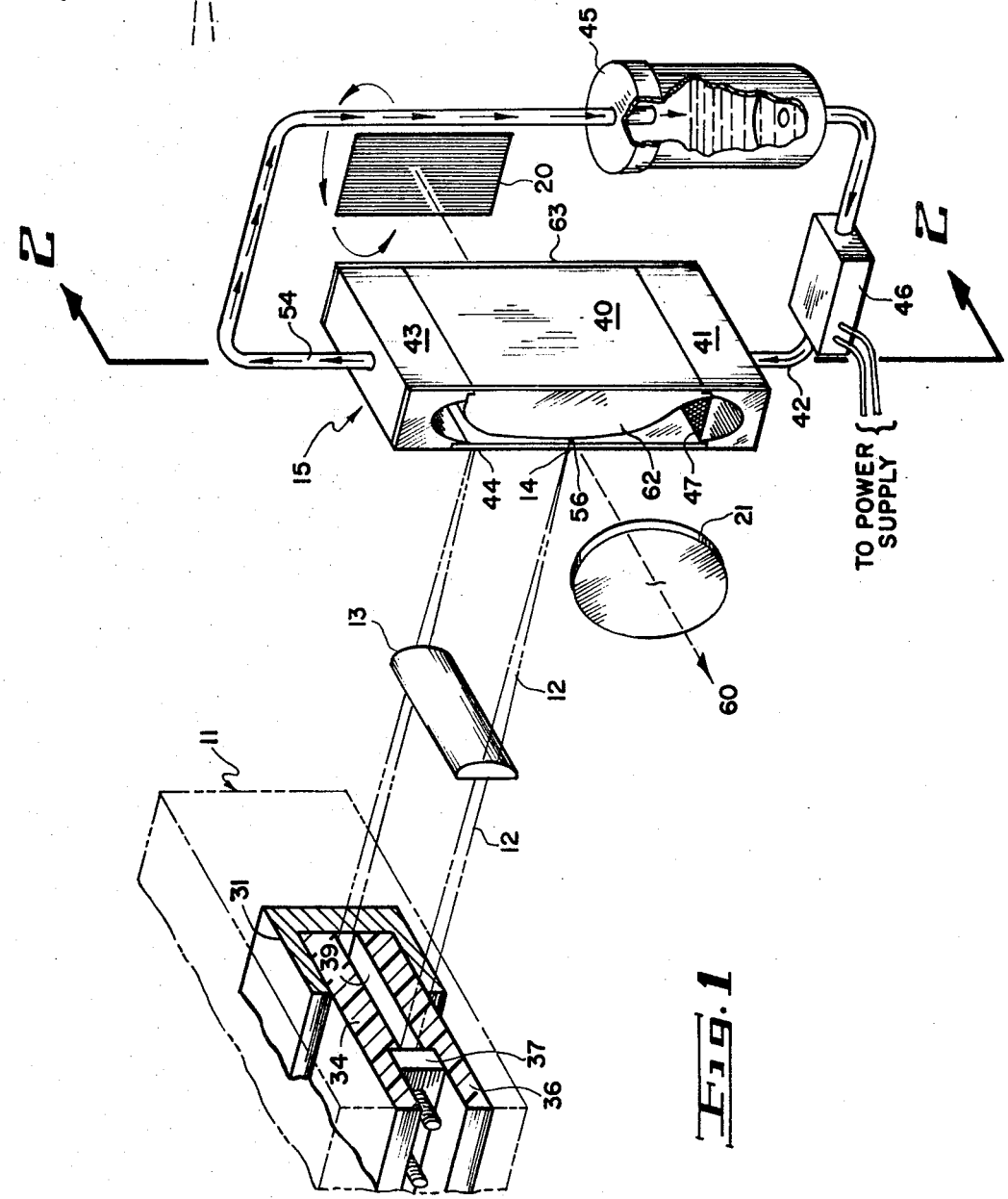

TRANSVERSE FLOWING LIQUID LASER

BACKGROUND RADIATION

The invention herein described was made in the course of or under a contract or subcontract thereunder, (or grant) with the Department of the Air Force.

The field of this invention relates to the production of stimulated radiation in materials which are dyes or which have properties similar to those dyes, and to methods and apparatus for producing such stimulated radiation.

It has been known for a number of years that stimulated emission can be produced in various organic liquids. The first such liquids were dyes, as reported by Sorokin et al, IBM Journal, Volume II, page 130, Mar. 1967, and since that time devices which have been used to produce such stimulated radiation have been commonly known as "dye lasers" even though the materials emitting the radiation could not be classified as "dyes" in the true definition of the word. Some materials which fluoresce or scintillate outside the visible spectrum have been used, for example. A compendium of materials which have served as the active medium in dye lasers is given both in the above cited article of Sorokin et al., and in the review of Kagan et al., Laser Forcus, page 26, Sept. 1968. Because the term "dye laser" has become commonplace, it is used herein, but with the understanding that the active laser medium can be other than a dye.

The characteristics of dye lasers which make them attractive are the possibility of wide spectral range and tunability at low cost. One can operate the laser anywhere in the visible or into the ultraviolet or infrared simply by using a solution which emits in the desired spectral region in conjunction with an appropriate optical cavity. The cost of the material is minimal, certainly far less than the cost of a group of conventional lasers emitting at different wavelengths, and also less than the cost of frequency doublers and other such devices. The output wavelength of a dye laser also is tunable, either by varying the concentration of the solvent or by introducing a wavelength selective element such as a grating into the optical cavity to control the emission wavelength. Significant spectral narrowing without significant energy reduction is an additional benefit obtained with the use of grating. Line widths of the order to 1 angstrom can be obtained in contrast to the 50–200 angstroms which are typical of the dye laser without frequency selection.

Typical dye lasers used in an effort to obtain these characteristics have been pumped with Q-switched ruby frequency doubled Nd doped laser or with flashlamps. Pumping has been either in a longitudinal geometry, in which the pumping radiation is colinear with the optical cavity axis and stimulated radiation, or in a transverse geometry, with the excitation at right angles to this axis.

Dye lasers have thus far fallen short of achieving their full potential, however, because (1) a number of useful materials are difficult to pump due to low quantum efficiency or high excited state losses due to singlet-triplet transitions or to triplet absorptions; (2) low conversion efficiencies, high coupling energy losses; (3) low pulse repetition rates are attained due to thermal effects induced during pumping; and (4) dye circulation problems and limitations. Therefore, the object of the present invention is to provide a dye laser capable of producing stimulated emission over a broad spectrum at high repetition rates, with frequency tuning, and which is an economical and practical device with high pumping efficiency and low energy coupling loss.

It is another object of the invention to provide apparatus for producing stimulated emission in a dye laser at higher repetition rates with more efficient operation.

A further object of the invention is to provide a homogeneous flowing dye medium which will maintain good optical properties from pulse to pulse.

A still further object of the invention is to provide apparatus for allowing the dye solution to flow rapidly through the optical cavity in a nearly laminar or non-turbulent manner.

According to the invention these objects are achieved in a dye laser which has a laser pump emitting a pulsed rectangular cross sectional beam of exciting or pumping radiation, which beam is focused to a line by a cylindrical lens or mirror. The focus line of pumping radiation is directed to lie within a segregated quantity or working region of lasing material, which can be an organic dye or similar material. Optical cavity means to intensify stimulated radiation emitted along the focus line are provided with a reflecting axis perpendicular to the pumping radiation. The optical cavity means includes wavelength selective means such as a grating to tune the output frequency. In preferred embodiments, the laser pump is a crossed field gas laser, more particularly a nitrogen gas laser emitting at 3,371 angstroms, the dye module is substantially as wide as the focused line of pumping radiation, and the focused line of pumping radiation is positioned near the inner surface of the dye module. The dye module is of an hydrodynamic design which provides a substantially laminar flowing dye solution through the working region.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings in which:

FIG. 1 is a perspective view with parts broken away of apparatus in accordance with the invention; and FIG. 2 is a sectional view through 2—2 of FIG. 1.

Attention is now directed to FIGS. 1 and 2 which illustrate a preferred embodiment of the invention.

A pumping laser 11 emits a rectangular beam 12 of coherent, collimated pumping radiation in pulse form. The rectangular beam 12 is converged in one dimension as shown by a cylindrical lens 13 and is focused to a line 14, similar results may be obtained with a spherical lens or appropriate mirror in place of the cylindrical lens. The focused line 14 of pumping radiation is at right angles to the short dimension of the beam 12. The working region of the module generally numerically designated as 15, having a width approximately equal to the length of line 14, is positioned so that the line 14 lies within it to bring about the excitation to higher energy levels, and the necessary population inversion for stimulated emission to occur in the laser material. A simple optical cavity for intensification of stimulated radiation in the laser material is formed by a conventional grating 20 and a partially reflective mirror 21, both of which are perpendicular to line 14. The stimulated radiation, at a wavelength determined by the laser material in the dye module passes through the mirror 21 as the output beam 60 of the dyP laser.

PUMPING LASER

The source of pumping radiation in the present invention is the pumping laser 11 which preferably is a pulsed cross field gas laser either using nitrogen ($N_2$) as the discharge gas and emitting at 3,371 angstroms in the ultraviolet or using neon as the discharge gas and emitting at 5,401 angstroms in the green. A suitable example of such a laser is that invented by R. Caristi, et al. described in U.S. Pat. No. 3,633,127 issued Jan. 4, 1972. A commercial version of this laser is provided by Avco Model C950 Pulsed Gas Laser.

Pumping laser 11 of the above type, as described more fully in the above U.S. patent, is constructed with a U-shaped aluminum base electrode 31, spaced Lucite side walls 34 and 36 facing each other within the base electrode, and an aluminum electrode 37 carried by the side walls 34 and 36. Through the rectangular duct 39 formed between electrodes 31 and 37 and between side walls 34 and 36, a supply of gas is flowed at appropriate pressure and a pulsed electric field is applied across electrodes 31 and 37 to cause the pulsed rectangular laser beam 12 to be emitted. For purpose of the present invention the gas flowed through duct is preferably nitrogen, which produces radiation at 3,371 angstroms in the ultraviolet for efficient pumping of most laser materials in the dye module 15, but it can also be neon, which emits at 5,401 angstroms in the green and is suitable for pumping of some materials, specifically materials which emit in the near infrared. Further details of operation of pumping laser 11 appear in the patent mentioned above. The following table summarizes typical performance characterisitics of the pumping laser 11 of the above type, employing nitrogen as the discharge gas.

NITROGEN PUMPING LASER CHARACTERISTICS

| | |
|---|---|
| Output wavelength | $\lambda = 3371 A$ |
| Bandwidth | $\Delta\lambda = 1 A$ |
| peak output power | 100kW |
| Effective pulse widths | 10 nanoseconds |
| Energy per pulse | 0.001 joules |
| Output beam dimension | ⅛" × 2" |
| Pulse repetition rate | 0 to 100 pps |

The high peak power and rapid pulse rise time, as well as the high possible repetition rate, all contribute to the excellent results of use of such a device as a source of pumping radiation, and it is believed that the favorable results obtained with the dye laser of the present invention are in substantial measure due to use of this crossed field nitrogen gas laser as a source of pumping radiation.

Further focusing aspects of the pumping arrangement are shown in FIG. 1. FIG. 1 illustrates how the parallel waves of the rectangular beam 12 are converged by the cylindrical lens 13 in the narrow (⅛inch) beam dimension into the line 14. The position of the line of focus 14 within the working region of the dye module 15 can be varied to suit the material in the dye module 15. For materials which lase only with difficulty, due to low quantum efficiency or excited state losses, highly concentrated pumping energy is desirable. For materials which lase readily, high concentrated pumping energy may produce the undesirable condition of super-radiance, in which radiation is emitted uncontrolled by the optical cavity. For such materials the lens may be somewhat defocused so that the energy concentration in the active medium is reduced by an increase in lasing volume.

FLOWING DYE CELL

Attention is directed to FIGS. 1 and 2 which illustrates the construction of dye module 15. The module 15 is designed to circulate a liquid laser material and comprises a rectangular structure which includes an inlet, outlet and working region. The hydrodynamics of the flowing dye module design is discussed in more detail hereinafter. The dye module 15 is constructed of a contoured shaped back portion 40, bottom portion 41 which includes inlet channel 42, and top portion 43, which includes the outlet channel 54. All portions in contact with the dye laser material are constructed of materials such as stainless steel, plastic, teflon or other materials which are inert to the dye material utilized. The front portion or window 44 is constructed of quartz or similar material which will pass the ultraviolet pumping energy from laser source 11 without materially reducing the energy thereof. The side portion 62 and 63 are constructed of materials such as glass which will pass the laser emission from the dye maJerial without reducing the energy of the output beam 60. If desired windows 44, 62 and 63 may be suitably anti-reflection coated. It should be noted that the full dye module 15 is canted to an angle to the incident beam 12, in order that the plane of output windows 62 and 63 form an obtuse angle with the output beam 60 in order to minimize the effects of windows 62 and 63 on the optical cavity. A similar result may be achieved by using wedge shaped windows.

In operation the liquid dye solution is drawn from reservoir 45 by pump 46 which is powered by an electrical power supply (not shown) and pumped into module 15. The dye solution is drawn from the bottom of the reservoir 45 and filled from the top in order to reduce the amount of bubbles and voids which may accumulate in the liquid laser material. After the dye solution is introduced into dye module 15 via inlet channel 42, the solution is then passed through inlet screen 47 which is a reticulated structure in order to break up any large turbulence into small scale turbulence which is damped out prior to entering the working region. The mesh size of the screen is discussed in more detail hereinafter. The dye solution then passes through a flow channel with a constantly decreasing cross section until it reaches the working region 56 wherein the flow velocity should be maximum and the flow nearly laminar. As previously mentioned, the output beam of pumping laser 11 is focused to a line 14 in the working region 56 in order to create the population inversion within the dye solution. The converging pumping or exciting laser beam 12 is introduced substantially transverse to the flow direction as well as transverse to the dye laser output beam 60.

After the dye solution passes through the working region 56, the dye solution then passes through an outlet channel of an ever increasing cross section. Finally, the dye solution is exhausted from the dye module via outlet channel 54 where upon it enters reservoir 45 from whence it may be recirculated back through the system. This process may be repeated until the dye solution breaks down. The repetition rate is increased because the solution is circulated to continually provide a fresh amount of dye solution within the working region. A fresh solution is capable of being excited free from any residual stored energy (such as heat or populated energy states) which the previously excited segment of the dye solution would contain.

A continuous flowing dye laser cell 15 as hereinbefore described was hydrodynamically designed to provide approximately a 1.5 to 1 gallon per minute flow rate of ethyl alcohol through a flow area 2 millimeters by 64 millimeters, the flow within the channel to be steady and uniform with a minimum level of turbulent fluctuations. To insure that the flow was steady and uniform, viscous or boundary layer displacement thickness effects were taken into consideration. To provide a minimum level of turbulent fluctuations were mesh screen 47 was inserted into the flow and followed by area contraction.

A typical calculation of displacement thickness effects and mesh size is given here by way of example. To compensate for viscous displacement thickness effects, it was first necessary to determine the flow Reynolds number, as defined as $$Re = \rho u x / \mu$$

where
$\rho$ = fluid density
$u$ = fluid velocity
$x$ = distance along channel wall
$\mu$ = viscosity The density of ethyl alcohol is 49.2 lbm/ft$^3$ at 20° C and the viscosity is $0.805 \times 10^{-3}$ lbm/sec ft also at 20° C. For the desired flow rate and flow area the velocity is 2.5 to 16 feet per second. The Reynolds number is then $$Re_x = 1.5 \times 10^5 \text{ to } 10^6 \text{ per foot}$$

The boundary layer thickness (Laminar) is given by $$\delta/x = 4.65/\sqrt{Re}$$
$$\delta = 4.65 \, x^{1/2}/\sqrt{Re_x}$$

For the extremes of Reynolds number encompassed by the flow channel $$\delta = \begin{cases} 0.012 \, (x)^{1/2} \text{ for } Re_x = 1.5 \times 10^5 \\ 0.0046 \, (x)^{1/2} \text{ for } Re_x = 10^6 \end{cases}$$

To estimate the boundary layer displacement thickness it was assumed that $$\delta^* = \delta/3$$

i.e., the effective displacement thickness, $\delta^*$, is approximately one third the viscous layer thickness. To compensate for the displacement thickness, a straight wall divergence was used, the angle of divergence being determined by the displacement thickness at the end of a given length of channel and by the channel length, $l$.

Following this procedure, the following table was calculated. $Re = 1.5 \times 10^5/\text{ft}$ $l = .01'$ $\delta^* = 0.004'$ $\theta = 2.3°$ half angle $l = 0.25'$ $\delta^* = 0.002'$ $\theta = 0.5°$ half angle $Re = 10^6/\text{ft}$ $l = 0.01'$ $\delta^* = 0.00016'$ $\theta = 0.1°$ half angle $l = 0.25'$ $\delta^* = 0.0024'$ $\theta = 0.2°$ half angle To effectively reduce the level of turbulence in the channel, the wire mesh or screen 47 was placed in the flow so that the initial turbulence level would be determined by the mesh size of screen 47. The screen is placed far enough upstream so that viscous dissipation smooths the flow out. A turbulence dissipation time is given by $$t_D = \rho \lambda^2 / \mu$$

where $\lambda$ is the turbulent scale size. Therefore, a dissipation length $D$, is given by $$D = u \cdot t_D = \rho u \lambda^2 / \mu = Re_\lambda \cdot \lambda$$

The velocity in this case is ten times lower than the channel velocity because there is an area reduction of ten from the screen to the channel entrance. For a mesh size ($\lambda$) of 0.001'

$$D = 0.015' - 0.098' \leq 1''$$

Therefore, a mesh with $\lambda = 0.01''$ was placed in the dye cell as shown in FIG. 1 upstream of the laser axis.

OPTICAL CAVITY

The radiation stimulated in the laser material in the working region of the dye module is intensified by an optical cavity having its reflecting axis parallel to line 14 and transverse to the direction of the pumping beam 12. As mentioned above and as shown in FIG. 1, the optical cavity may be comprised of a grating 20 and a partially reflective mirror 21 or alternatively may be comprised of two mirrors, one of which is 100 percent reflecting for greatest intensification (replacing the reflective grating), and the other of which is partially transmitting to permit output beam 60 of stimulated radiation to exit from the device.

As shown in FIG. 1, the grating reflector 20 is used to provide wavelength tuning. The criteria to be followed in selecting the properties of grating 20 will depend to some extent on the use to which the output beam 60 is to be put, but it is generally desirable to select a grating which is efficient at the wavelengths of interest and with blaze selected for highest energy, and with high resolution and dispersion to produce an output of greatest monochromaticity. The relationships of groove spacing and number, and blaze, to produce these results are well known in optics and neee not be repeated here. Tuning is achieved, as is well known, by varying the angle of the grating until the desired wavelength is obtained. Other wavelength selective elements, for example a Littrow prism, can also be substituted for grating 20.

For further spectral narrowing a transmission filter can be inserted in the optical cavity. In such a situation the use of a Fabry-Perot etalon is positioned at an appropriate angle to the cavity axis to pass radiation of the desired frequency. The tilted partially reflecting inner surfaces of this etalon form a resonant cavity which provides spectral narrowing to a high degree, and line widths on the order of 0.01 angstroms in output beam are obtainable with such a device. Furthermore, the grating in the optical cavity can be replaced with a concave mirror to form a stable cavity or a convex mirror to form an unstable cavity either of which will help to suppress any unwanted transverse modes.

OPERATION AND RESULTS

The dye laser arranged as described above has been tested with a variety of laser materials. It was found that high conversion efficiencies could be obtained. Moreover, the extremely short pulse widths and the fast repetition rate with the use of dye circulation which were obtained are two unique and valuable features of the present scheme. Use of a diffraction grating instead of a 100 percent reflecting mirror for one end of the optical permitted the laser wavelength to be tuned and also permitted the effective wavelength range of each dye to be extended. Tuning of the radiation to a narrow band pass resulted in no apparent loss of efficiencies at the wavelengths of the natural fluorescence, but there was observed a definite variation of efficiency with wavelength. Efficiency is also a function of concentration of the dye, and the output spectral distribution is also a function of concentration. The rapid pulse rate with little loss in efficiency which is obtainable in the present invention indicates that the recovery of the dyes must be fast when pumped in the manner described above.

Typical test results using the dye laser of the present invention were obtained using 3-Amino Phthalimide as a dye with ethyl alcohol as a solvent. This solution was found to lase in the spectral range of 4,900A to 5,100A, with etalons the dye laser was able to develop a band width of 0.02A. The dye solution was flowed through the cell at 50 cc/second. The conversion efficiency of the dye laser was 4 percent which generated a peak power of about 48 microjoules at a pulse rate of 120 pulses per second at a pulse width of 2 nanoseconds.

As the above results make clear, the present dye laser combines higher peak power ratios with short pulse width and rapid pulse rates to make this a very valuable method of stimulating radiation in dyes. By providing a variety of different dyes, it can be appreciated that the present dye laser will permit a broad spectral range to be covered at high efficiencies simply by replacing dye solution and by making simple adjustments in the grating.

The various features and advantages of the invention are thought to be clear from the foregoing description. Various other features and advantages not specifically enumerated will undoubtedly occur to those versed in the art as likewise will many variations and modifications of the preferred embodiment illustrated, all of which may be achieved without departing from the spirit and scope of the invention defined by the following claims.

What is claimed is:

1. Apparatus for producing stimulated radiation in a flowing liquid laser material comprising:
   a. pumping laser means emitting a rectangular beam of pumping radiation;
   b. focusing means positioned to focus said rectangular beam substantially to a line;
   c. liquid pumping means for circulating said liquid laser material;
   d. container means including means for receiving and discharging said laser material from said liquid pump, said container means further including means defining a channel for providing substantially laminar flow through a restricted area defining the working region wherein the flow velocity is increased, the cross-sectional area of said channel continuously decreasing from said laser material receiving means toward said working region and continuously increasing from said working region to said laser material discharging means, said container having a front window through which said beam passes and said container being positioned such that said line of focus is substantially transverse to said flow direction and is located within said working region and adjacent said front window at about the location of the smallest cross-sectional area of said channel, said container additionally having two side windows through which the stimulated emission produced in the working region may pass; and
   e. optical cavity means spaced from said container for intensifying stimulated radiation emitted from the laser material along said line of focus, said optical cavity means having a reflecting axis substantially coincident with said line of focus of pumping radiation.

2. Apparatus according to claim 1 wherein said pumping laser means is a crossed field gas discharge laser.

3. Apparatus according to claim 2 wherein said emitted radiation has a wavelength of 3,371A.

4. Apparatus according to claim 1 wherein said means for receiving said laser material from said liquid pump includes a reticulated structure positioned transverse to said flow direction and substantially covering the cross sectional area of said means, whereby said laser material received from said pump passes through said reticulated structure.

5. Apparatus according to claim 1 wherein said laser material is 3-Amino Phthalimide.

6. Apparatus according to claim 1 wherein said stimulated radiation emitted from said laser has a wavelength greater than 4,900A and less than 5,100A.

7. In apparatus for producing stimulated radiation in a flowing liquid laser material comprising; liquid pumping means for circulating said laser material, pumping laser means emitting a beam of pumping radiation, focusing means positioned to focus said beam into the population inversion region of said liquid laser material and optical cavity means for intensifying stimulated radiation emitting from said liquid laser material the improvement comprising:

dye module means coupled in circuit with said liquid pumping means and through which liquid laser material flows, said dye module means having a front window through which said beam passes, oppositely disposed side windows through which the stimulated emission produced in the liquid laser material may pass, and a rear portion hydrodynamically contoured which in combination with said front window define between said side windows a flow channel having a liquid laser material inlet and a liquid laser material outlet, said flow channel providing substantially laminar flow through a restricted portion, said restricted portion defining the population inversion region wherein the flow velocity is increased, said restricted portion having a substantially rectangular cross section normal to the direction of flow of said liquid laser material, the cross-sectional area normal to the direction of flow of said liquid laser material of said flow channel, beginning at said liquid material inlet and progressing in the direction of flow through said restricted portion to said liquid material outlet, smoothly decreasing in cross-sectional area to a minimum cross-sectional area in said restricted portion and then smoothly increasing to said liquid material outlet.

* * * * *

PO-1050
(5/69)

UNITED STATES PATENT OFFICE
CERTIFICATE OF CORRECTION

Patent No. 3,740,665  Dated June 19, 1973

Inventor(s) Irving Itzkan

It is certified that error appears in the above-identified patent and that said Letters Patent are hereby corrected as shown below:

Column 1, line 26, for "Forcus", read --Focus--; Column 3, line 2, for "dyP", read --dye--; Column 4, line 25, for "maJerial", read --material--; Column 5, line 15, for "were", read --wire--; Column 5, line 31, for "$0.805 \times 10^{-3}$", read --$0.807 \times 10^{-3}$--; Column 6, line 56, for "neee", read --need--; and Column 7, lines 16 and 17, after "optical", read --cavity--.

Signed and sealed this 16th day of April 1974.

(SEAL)
Attest:

EDWARD M. FLETCHER, JR.
Attesting Officer

C. MARSHALL DANN
Commissioner of Patents